US007351369B2

(12) United States Patent
King, Jr.

(10) Patent No.: US 7,351,369 B2
(45) Date of Patent: Apr. 1, 2008

(54) MOLDED TWIST-ON WIRE CONNECTOR

(75) Inventor: L. Herbert King, Jr., Chesterfield, MO (US)

(73) Assignee: King Technology, O'Fallon, MO (US)

(*) Notice: Subject to any disclaimer, the term of this patent is extended or adjusted under 35 U.S.C. 154(b) by 0 days.

(21) Appl. No.: 11/157,123

(22) Filed: Jun. 20, 2005

(65) Prior Publication Data

US 2005/0282428 A1 Dec. 22, 2005

Related U.S. Application Data

(60) Provisional application No. 60/581,603, filed on Jun. 21, 2004.

(51) Int. Cl.
*C04B 35/00* (2006.01)
*B28B 7/22* (2006.01)

(52) U.S. Cl. ...................... 264/294; 264/104; 264/241; 264/250; 264/255; 264/259; 264/271.1; 264/318; 264/328.7; 264/328.8; 174/74 R; 174/84 R; 174/87; 29/858

(58) Field of Classification Search ..................... None
See application file for complete search history.

(56) References Cited

U.S. PATENT DOCUMENTS 2,297,741 A * 10/1942 Bruner ....................... 425/124
2,823,249 A * 2/1958 Curtiss ........................ 174/87
3,206,833 A * 9/1965 Yonkers ...................... 29/878
3,530,342 A * 9/1970 Klein ........................ 29/25.03
3,888,376 A * 6/1975 Cooke ........................ 215/217
4,018,983 A 4/1977 Pedlow ....................... 174/135
4,104,482 A 8/1978 Scott ........................... 174/87
4,295,004 A 10/1981 Dauser, Jr. .................... 174/87
4,367,371 A 1/1983 Nakamura ................ 174/52 R
4,647,717 A 3/1987 Uken .......................... 174/84
4,695,241 A 9/1987 Ventimiglia ................. 425/275
4,840,219 A * 6/1989 Foreman ..................... 164/369
D315,139 S 3/1991 Blaha ........................ D13/150
5,001,301 A * 3/1991 Marr et al. .................. 174/87
5,132,494 A 7/1992 Burton et al. ................ 174/87
5,350,318 A * 9/1994 Nees .......................... 439/593
5,441,560 A 8/1995 Chiotis et al. ........... 106/18.12
5,718,930 A * 2/1998 Stengel ....................... 425/556
5,740,854 A * 4/1998 Inoue et al. ................ 164/495
5,772,803 A * 6/1998 Peker et al. ................ 148/561
5,975,939 A * 11/1999 Market ....................... 439/415
6,252,170 B1 6/2001 Korinek ....................... 174/87
6,359,226 B1 3/2002 Biddell et al. ............ 174/74 A
6,414,243 B1 * 7/2002 Korinek et al. ............... 174/87

(Continued)

OTHER PUBLICATIONS

Mark Telford, The Base for Bulk Metallic Glass, Materials Today, Mar. 2004, pp. 36-43.

(Continued)

*Primary Examiner*—Christina Johnson
*Assistant Examiner*—Jeff Wollschlager
(74) *Attorney, Agent, or Firm*—Jacobson & Johnson

(57) ABSTRACT

A wire connector wherein the wire engaging core and electrically insulated housing are molded with an exterior surface of a molded wire engaging core used as a mold surface as the electrically insulated housing is molded around the wire engaging core to provide a wire connector with a molded housing and a molded wire engaging core.

4 Claims, 1 Drawing Sheet

U.S. PATENT DOCUMENTS

| | | | | |
|---|---|---|---|---|
| 6,427,753 | B1 * | 8/2002 | Inoue et al. | 164/80 |
| 6,478,606 | B1 | 11/2002 | McNerney et al. | 439/415 |
| 6,601,296 | B1 * | 8/2003 | Dailey et al. | 29/848 |
| 6,620,264 | B2 * | 9/2003 | Kundig et al. | 148/538 |
| 6,784,370 | B1 * | 8/2004 | Keswani et al. | 174/87 |
| 6,817,905 | B2 * | 11/2004 | Zart et al. | 439/736 |
| 6,854,996 | B2 * | 2/2005 | Yaworski et al. | 439/276 |
| 6,914,191 | B2 * | 7/2005 | Leith et al. | 174/87 |
| 7,086,150 | B2 * | 8/2006 | King et al. | 29/883 |
| 2003/0222122 | A1 * | 12/2003 | Johnson et al. | 228/101 |

OTHER PUBLICATIONS http://www.liquidmetal.com/technology/default.asp. Liquidmetal Technologies, May 2, 2005.

Author unknown, Bulk Metallic Glass, undated.

* cited by examiner

MOLDED TWIST-ON WIRE CONNECTOR

CROSS REFERENCE TO RELATED APPLICATIONS

This application claims priority from U.S. provisional patent application Ser. No. 60/581,603 titled Molded Wire Connector filed Jun. 21, 2004.

FIELD OF THE INVENTION

This invention relates generally to molded electrical connectors and a method of making electrical connectors though a molding process and, more specifically, an electrical twist-on wire connector wherein the twist-on wire connector is formed of different materials with each of the materials molded in situ to form a twist-on electrical wire connector.

STATEMENT REGARDING FEDERALLY SPONSORED RESEARCH OR DEVELOPMENT

None

REFERENCE TO A MICROFICHE APPENDIX

None

BACKGROUND OF THE INVENTION

In the manufacture of electrical twist-on wire connectors a wire is wound into a spiral core and the spiral core is then inserted into a plastic or insulated housing. To protect the wire junction in the twist-on wire connector a sealant can be inserted into the spiral wire core. When the wires are inserted into the spiral core and twisted one forms a low resistance electrical connector therein. A twist-on wire connectors with a sealant is shown in my U.S. Pat. Nos. 5,113,037; 5,023,402 and 5,151,239.

The use of a wire that is shaped into a spiral thread for insertion into the insulating shell of the twist-on wire connector requires the steps of creating the wire from a raw metal, forming the wire into a spiral core by winding the wire around some type of support and cutting the wire to length. The spiral core can then transferred into an insulated plastic housing which is generally molded through an injection molding process. If the twist-on wire connector includes a sealant a sealant is injected into the spiral core of the twist-on wire connector once the insulating sleeve is positioned around the wire core. The concept of making a twist-on wire connector with a sealant therein is more thoroughly described in my U.S. Pat. No. 5,771,578.

The present invention eliminates the multi-processing required to form a typical twist-on wire connector through the process of molding a spiral core from an amorphous alloy often referred to as bulk metallic glass and then molding the electrical insulating housing around the amorphous alloy spiral core to enable the formation of a twist-on wire connector through a sequence of molding steps. In addition, if the twist-on wire connector is to contain a sealant the sealant can be injected into the cavity in the spiral core. Thus the process of formation of a twist-on wire connector can be formed entirely through a molding process thereby reducing the handling and assembling problems.

SUMMARY OF THE INVENTION

An electrical wire connector and method of making wherein an electrical wire engaging core of the wire connector comprises an amorphous alloy and the outer housing comprises an electrical insulating material with an electrical twist-on wire connector formable through a molding process wherein the core is molded from an amorphous alloy and the electrically insulating housing is molded around the core to enable a ready-to-use electrical connector to be formed through a molding process.

DESCRIPTION OF THE PREFERRED EMBODIMENT

Figure 1:
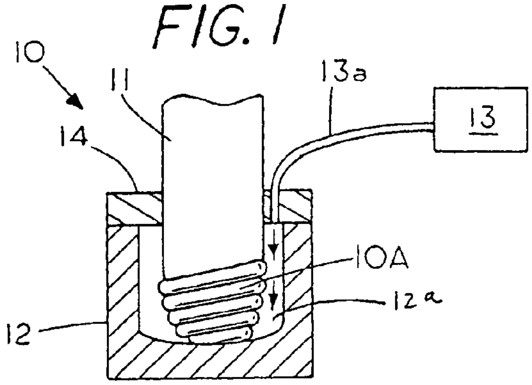
FIG. 1 shows a cross-sectional view of a mandrel having an end in the shape of female thread on a twist-on wire connector positioned in a mold as a liquid metal is injected into the mold.
Figure 2:
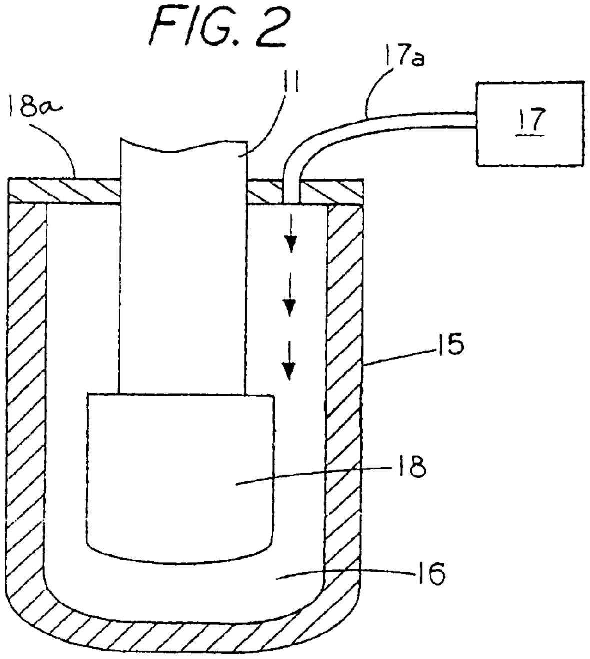
FIG. 2 show the solidified liquid metal core positioned in mold as an insulating plastic is injected molded around both the mandrel and the injection mold core.

FIG. 1 shows a cross-sectional view of a mandrel 11 having an end in the shape of female trade 12*a* for a spiral core for a twist-on wire connector. The mandrel 11 is positioned in a mold 12 having a lid 14 that surrounds the mandrel 11 and forms a cover thereon. A source of liquid metal 13 is injected into the mold cavity through line 13*a* The liquid metal fills the opening and solidifies around the mandrel spiral thread 10*a* The liquid metal used comprises an amorphous alloy with high yield strength and excellent definition. The amorphous alloys are describe in U.S. Pat. Nos. 5,288,344; 5,618,359 and 6,466,558 and are sold by amorphous technologies international corporation of California FIG. 2 show the solidified wire engaging core which can be a spiral core 18 that has been injection molded positioned in mold cavity 16 formed by mold 15. A cover 18*a* extends over the top of the mold cavity 16. A source of an electrically insulating plastic 17 is shown connected to mold cavity 16 by a conduit 17*a* to allow one to injection mold the electrically insulating plastic around both the mandrel and the solidified wire engaging core 18.

Figure 3:
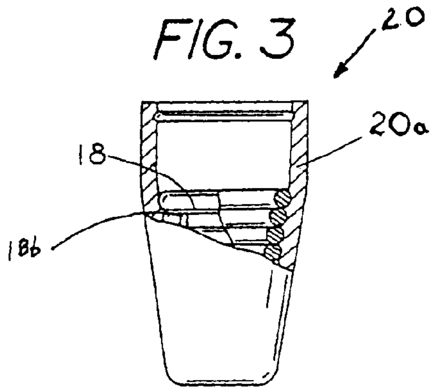
FIG. 3 shows a twist-on wire connector partially in section with the mandrel removed therefrom to leave a twist-on wire connector wherein both the insulated housing and the electrically conducting spiral core have been injected molded.

FIG. 3 shows a twist-on wire connector 20 partially in section with the mandrel removed therefrom to leave the injection molded spiral core 18 within the injection molded insulated housing 20.

In order to prevent rotation of the wire engaging member an external surface of the wire core can contains an irregularity 18*b* so that the electrically insulated material injected therearound mechanically engages the external surface irregularity 18*b* of the wire engaging core 18 to prevent rotation of the spiral core 18 with respect to housing 20.

Thus the twist-on wire connector of FIG. 3 has been formed by an injection molding of a liquid metal around a mandrel having a spiral end. After solidification of the spiral core around the mandrel the mandrel with the spiral core is placed in a further mold, as shown in FIG. 2, while an electrically insulated housing is injected molded around the Thus the method of the present invention comprises a method of making a twist-on wire connector 20 by forming a mold cavity 12*a* in a first mold 12 having an internal mold part 11 having a mold surface 10*a* in the shape of a female spiral thread. One can then inject a liquid metal 13 into the mold cavity 12*a* to form an electrically conducting spiral core 18. Next, one removes the electrically conducting spiral core 18 from the mold cavity 12*a* while retaining the electrically conducting spiral core 18 on the internal mold part 11. In the next step one places the electrically conducting core in a second mold cavity 16 and injects an electrically insulating polymer plastic 17 into a second mold cavity 16 to cover an exterior surface 18*a* of the spiral core 18. One can them remove the internal mold part 11 from the second mold 15 while retaining the spiral core 18 therein to provide an injection molded twist-on wire connector 20 with an electrically conducting spiral core 18 and an external insulated housing 20.

While the present invention is shown in relation to forming a twist-on wire connector the present method is suitable for forming other electrical connectors that have two different materials forming the electrical connector.

I claim:

1. A method of making a twist-on wire connector comprising:

forming a mold cavity in a first mold having an internal mold part with the internal mold part having a mold surface in the shape of a female spiral thread;

injecting a liquid metal into the mold cavity to form an electrically conducting spiral core;

removing the electrically conducting spiral core from the mold cavity by removing the internal mold part with the electrically conducting spiral core retained thereon;

placing the electrically conducting spiral core retained on the internal mold part in a second mold cavity;

injecting an electrically insulating polymer plastic into a second mold cavity to cover an exterior surface of the electrically conducting spiral core;

removing the internal mold part from the second mold while retaining the electrically conducting spiral core on the internal mold part to provide an injection molded twist-on wire connector with an electrically conducting spiral core and an external insulated housing;

wherein the liquid metal injected comprises a liquid metallic amorphous alloy.

2. The method of claim 1 wherein the internal mold part is a thread that can be rotationally removed from the spiral core once the spiral core is solidified.

3. The method of claim 1 wherein an external surface of the spiral core contains an irregularity so that the electrically insulated material injected therearound mechanically engages the irregularity on the surface of the spiral core to prevent rotation of the spiral core with respect to the electrically insulating material.

4. A method of making a wire connector comprising:

forming a mold cavity in a first mold having an internal mold part having a mold surface in the shape of a wire engaging core;

injecting a liquid metal into the mold cavity to form a wire engaging core;

removing the wire engaging core from the mold cavity by removing the internal mold part with the wire engaging core retained thereon;

placing the wire engaging core retained on the internal mold part in a second mold cavity;

injecting an electrically insulating material into a second mold cavity to cover an exterior surface of the wire engaging core;

removing the internal mold part from the second mold while retaining the wire engaging core on the internal mold part to provide an injection molded wire connector with a wire engaging core and an external insulated housing;

wherein the liquid metal injected comprises a liquid metallic amorphous alloy.

* * * * *